(12) United States Patent
Fujisawa et al.

(10) Patent No.: US 10,413,861 B2
(45) Date of Patent: Sep. 17, 2019

(54) SEPARATION METHOD AND SEPARATION DEVICE

(71) Applicant: KOBE STEEL, LTD., Kobe-shi (JP)

(72) Inventors: Akitoshi Fujisawa, Kobe (JP); Koji Noishiki, Takasago (JP); Akira Matsuoka, Kobe (JP)

(73) Assignee: KOBE STEEL, LTD., Kobe-shi (JP)

( * ) Notice: Subject to any disclaimer, the term of this patent is extended or adjusted under 35 U.S.C. 154(b) by 719 days.

(21) Appl. No.: 14/896,855

(22) PCT Filed: Jun. 25, 2014

(86) PCT No.: PCT/JP2014/066904
§ 371 (c)(1),
(2) Date: Dec. 8, 2015

(87) PCT Pub. No.: WO2015/002054
PCT Pub. Date: Jan. 8, 2015

(65) Prior Publication Data
US 2016/0121263 A1    May 5, 2016

(30) Foreign Application Priority Data
Jul. 5, 2013    (JP) .................................. 2013-141561

(51) Int. Cl.
*B01D 46/46*    (2006.01)
*B01D 53/14*    (2006.01)
(Continued)

(52) U.S. Cl.
CPC ..... *B01D 53/1475* (2013.01); *B01D 53/1412* (2013.01); *B01D 53/1425* (2013.01);
(Continued)

(58) Field of Classification Search
None
See application file for complete search history.

(56) References Cited

U.S. PATENT DOCUMENTS 6,126,723 A * 10/2000 Drost ..................... B01B 1/005
96/108
2008/0056972 A1    3/2008 Iijima
(Continued)

FOREIGN PATENT DOCUMENTS

CN    102784542 A  * 11/2012
JP    2007-098225 A    4/2007
(Continued)

OTHER PUBLICATIONS

Translation of CN102784542A, accessed Jul. 6, 2018 (Year: 2012).*
International Search Report and Written Opinion dated Sep. 30, 2014 for PCT/JP2014/066904 filed on Jun. 25, 2014.

*Primary Examiner* — Amber R Orlando
*Assistant Examiner* — Phillip Y Shao
(74) *Attorney, Agent, or Firm* — Oblon, McClelland, Maier & Neustadt, L.L.P.

(57) ABSTRACT

A separation method including: preparing a separation device including an absorption processor absorbing into an absorption liquid a target component in a fluid to be processed, by an absorption microduct and a cooling medium microduct positioned for heat exchange; causing the fluid to be processed and the absorption liquid to pass through the absorption microduct in mutual contact, thus causing the target component to be absorbed into the absorption liquid from the fluid to be processed; cooling the fluid to be processed and the absorption liquid by flowing a cooling medium through the cooling medium microduct, and causing heat exchange between the fluid to be processed and absorption liquid flowing through the absorption microduct and the cooling medium; and separating, into the fluid to be processed and the absorption liquid, the mixed fluid of the fluid to be processed after the target component has been absorbed by the absorption liquid.

5 Claims, 6 Drawing Sheets

(51) Int. Cl.
*B01J 19/00* (2006.01)
*B01D 53/18* (2006.01)

(52) U.S. Cl.
CPC .............. *B01D 53/18* (2013.01); *B01J 19/00* (2013.01); *B01D 2252/103* (2013.01); *B01D 2252/204* (2013.01); *B01D 2252/30* (2013.01); *Y02C 10/04* (2013.01); *Y02C 10/06* (2013.01)

(56) References Cited

U.S. PATENT DOCUMENTS

| | | |
|---|---|---|
| 2009/0043141 A1 | 2/2009 | Mazanec et al. |
| 2009/0071335 A1 | 3/2009 | Tonkovich et al. |
| 2010/0024645 A1 | 2/2010 | Tonkovich et al. |
| 2010/0064892 A1* | 3/2010 | Linsday ............. C25B 15/08 95/254 |
| 2012/0000643 A1* | 1/2012 | Bruun ................ B01D 19/00 166/75.12 |
| 2012/0111194 A1 | 5/2012 | Miyagawa et al. |
| 2013/0118588 A1 | 5/2013 | Noishiki et al. |

FOREIGN PATENT DOCUMENTS

| | | |
|---|---|---|
| JP | 2008-062165 A | 3/2008 |
| JP | 2008-296211 A | 12/2008 |
| JP | 2012-11333 A | 1/2012 |
| JP | 2013-103155 A | 5/2013 |
| WO | 2009/017832 A1 | 2/2009 |
| WO | WO 2010/137399 A1 | 12/2010 |

* cited by examiner

SEPARATION METHOD AND SEPARATION DEVICE

TECHNICAL FIELD

The present invention relates to a separation method and a separation device for separating a target component from a fluid to be processed.

BACKGROUND ART

Conventionally, a separation method for separating a target component from a fluid to be processed is known. For example, an example of such a separation method is disclosed in the following Patent Document 1.

In the following Patent Document 1, a method of separating and recovering $CO_2$ as a target component from a $CO_2$ containing gas (an exhaust gas) as a fluid to be processed by causing $CO_2$ to be absorbed into an absorption liquid from the $CO_2$ containing gas is represented. Then, in the following Patent Document 1, in order to implement the separation and recovery method, a $CO_2$ recovery device with an absorption tower for absorbing $CO_2$ in the $CO_2$ containing gas into the absorption liquid is used. In the absorption tower of the $CO_2$ recovery device, while the $CO_2$ containing gas is introduced into the absorption tower from the lower part of the absorption tower, the absorption liquid is introduced into the absorption tower from the upper part of the absorption tower, and the $CO_2$ containing gas going up within the absorption tower and the absorption liquid going down from the upper part are brought into countercurrent contact with each other, thereby $CO_2$ is absorbed into the absorption liquid from the $CO_2$ containing gas.

Within the absorption tower used in the conventional separation and recovery method, heat of absorption is produced by absorption of $CO_2$ into the absorption liquid from the $CO_2$ containing gas, thereby increasing the temperature of the absorption liquid. When the temperature of the absorption liquid increases, the absorbed amount of $CO_2$ per unit liquid amount of the absorption liquid decreases, and as a result, separation efficiency of $CO_2$ is decreased. If trying to supplement the decrease in separation efficiency, the amount of the absorption liquid in contact with the $CO_2$ containing gas needs to be increased. In that case, the absorption tower must be increased in size, and as a result, the separation device is increased in size.

CITATION LIST

Patent Document

Patent Document 1: JP 2008-62165 A

SUMMARY OF THE INVENTION

An object of the present invention is to make it possible to separate a target component from a fluid to be processed with an excellent separation efficiency while miniaturizing a separation device.

A separation method according to one aspect of the present invention is a method of separating a target component as a separation object from a fluid to be processed, the method including: a preparation step for preparing a separation device including an absorption processing unit for absorbing the target component in the fluid to be processed into an absorption liquid, the absorption processing unit having therein an absorption duct that is a microduct, and a cooling medium duct that is a microduct disposed at a position at which heat exchange is possible with the absorption duct; an absorption step for causing the fluid to be processed and the absorption liquid to pass through the absorption duct in a state of mutual contact, thus causing the target component to be absorbed into the absorption liquid from the fluid to be processed during the process of passing through; a cooling step for cooling the fluid to be processed and the absorption liquid by causing the flow through the cooling medium duct of a cooling medium having a lower temperature than that of the fluid to be processed and absorption liquid flowing through the absorption duct, and causing heat exchange between the fluid to be processed and absorption liquid flowing through the absorption duct and the cooling medium; and a post-absorption separation step for separating, into the fluid to be processed and the absorption liquid, the mixed fluid of the fluid to be processed after the target component has been absorbed by the absorption liquid during the absorption step and the absorption liquid after having absorbed the target component.

A separation device according to another aspect of the present invention is a separation device for separating a target component as a separation object from a fluid to be processed, the device including: an absorption processing unit for absorbing the target component from the fluid to be processed into an absorption liquid; and a post-absorption separation unit for separating, into the fluid to be processed and the absorption liquid, the mixed fluid of the fluid to be processed after the target component has been absorbed by the absorption liquid in the absorption processing unit and the absorption liquid after having absorbed the target component, the absorption processing unit being provided with therein an absorption duct that is a microduct for causing the fluid to be processed and the absorption liquid to pass through in a state of mutual contact, thus causing the target component to be absorbed into the absorption liquid from the fluid to be processed during the process of passing through, and a cooling medium duct that is a microduct disposed at a position at which heat exchange is possible with the absorption duct, for causing the flow of a cooling medium having a lower temperature than that of the fluid to be processed and absorption liquid flowing through the absorption duct, and causing heat exchange between the fluid to be processed and absorption liquid flowing through the absorption duct and the cooling medium.

DESCRIPTION OF EMBODIMENTS

Hereinafter, embodiments of the present invention will be described with reference to the drawings.

First, with reference to FIGS. 1 to 7, the configuration of a separation device 1 used in a separation method according to one embodiment of the present invention will be described.

Figure 1:
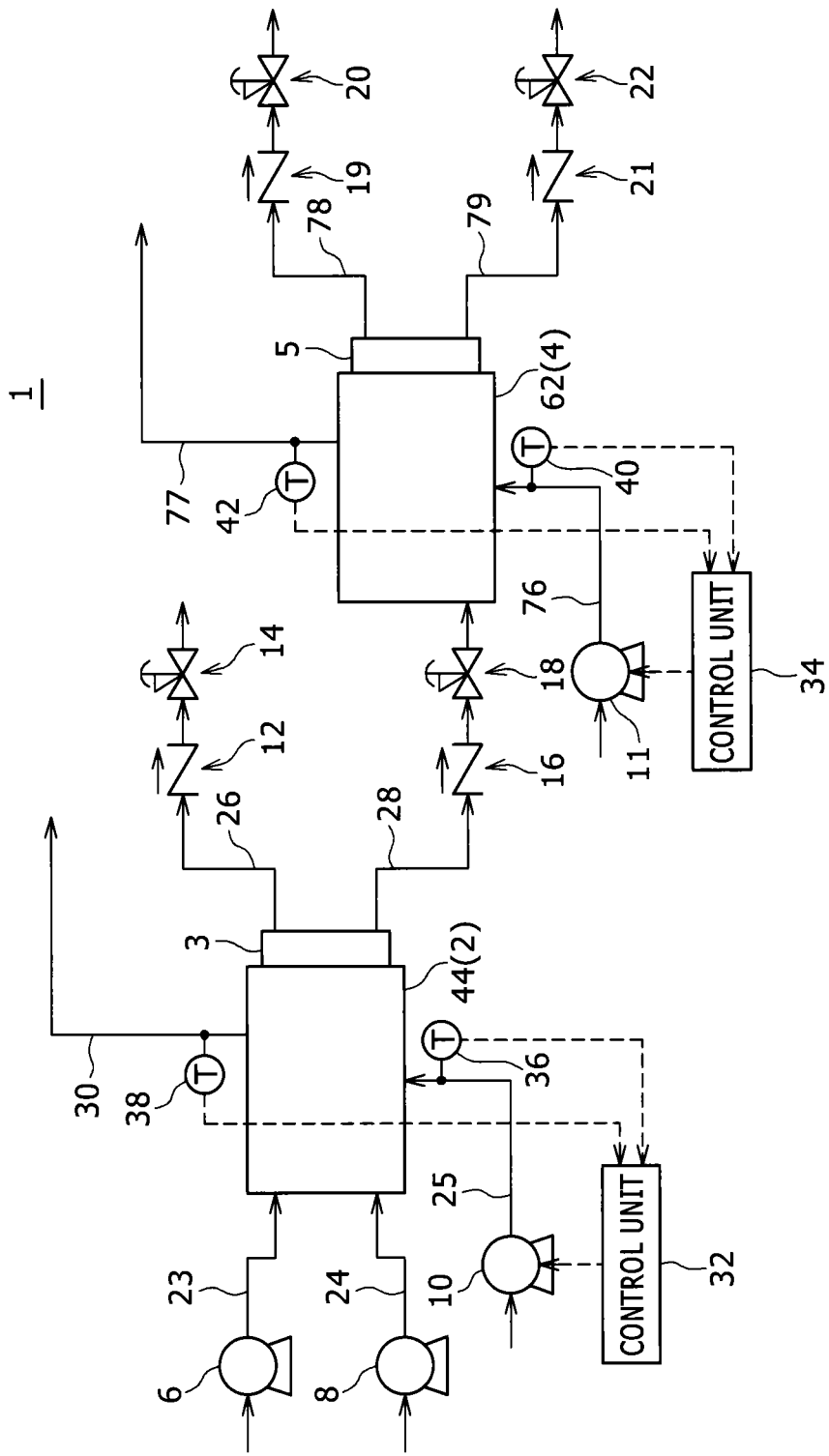
FIG. 1 is a schematic view showing the overall configuration of a separation device of one embodiment of the present invention.

In FIG. 1, the overall configuration of the separation device 1 of the present embodiment is shown. As shown in FIG. 1, the separation device 1 includes an absorption processing unit 2, a post-absorption separation unit 3, a diffusion processing unit 4, a post-diffusion separation unit 5, a fluid to be processed delivery unit 6, an absorption liquid delivery unit 8, a cooling medium delivery unit 10, a heat medium delivery unit 11, a first check valve 12, a first pressure regulating valve 14, a second check valve 16, a second pressure regulating valve 18, a third check valve 19, a third pressure regulating valve 20, a fourth check valve 21, a fourth pressure regulating valve 22, a first control unit 32, a second control unit 34, an entry side cooling medium temperature sensor 36, an exit side cooling medium temperature sensor 38, an entry side heat medium temperature sensor 40, and an exit side heat medium temperature sensor 42.

Figure 2:
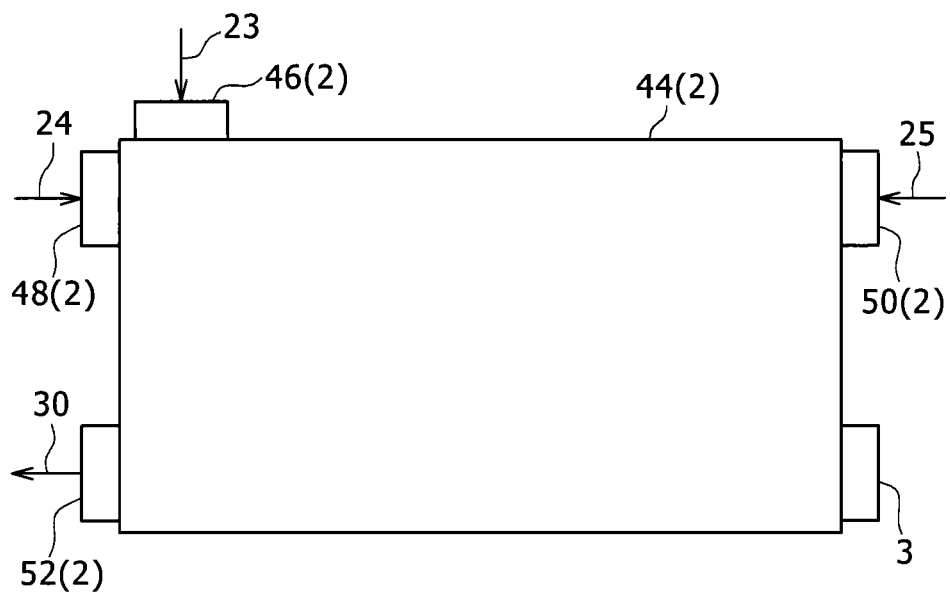
FIG. 2 is a plan view of an absorption processing unit and a post-absorption separation unit of the separation device shown in FIG. 1 viewed from above.

The absorption processing unit 2 performs processing of absorbing a target component as a separation object into an absorption liquid from a fluid to be processed containing the target component. The absorption processing unit 2 has a laminated body 44 consisting of a lot of plates laminated vertically, a fluid to be processed supply header 46, an absorption liquid supply header 48, a cooling medium supply header 50, and a cooling medium discharge header 52. It should be noted that although illustrations of the respective headers 46, 48, 50, 52 are omitted in FIG. 1 for the sake of simplicity, the respective headers 46, 48, 50, 52 are attached around the laminated body 44 as shown in FIG. 2 that is a plan view of the absorption processing unit 2 viewed from above.

In a lot of plates constituting the laminated body 44, a plurality of absorption plates 54 (see FIG. 3) and a plurality of cooling medium plates 56 (see FIG. 4) are included.

Figure 3:
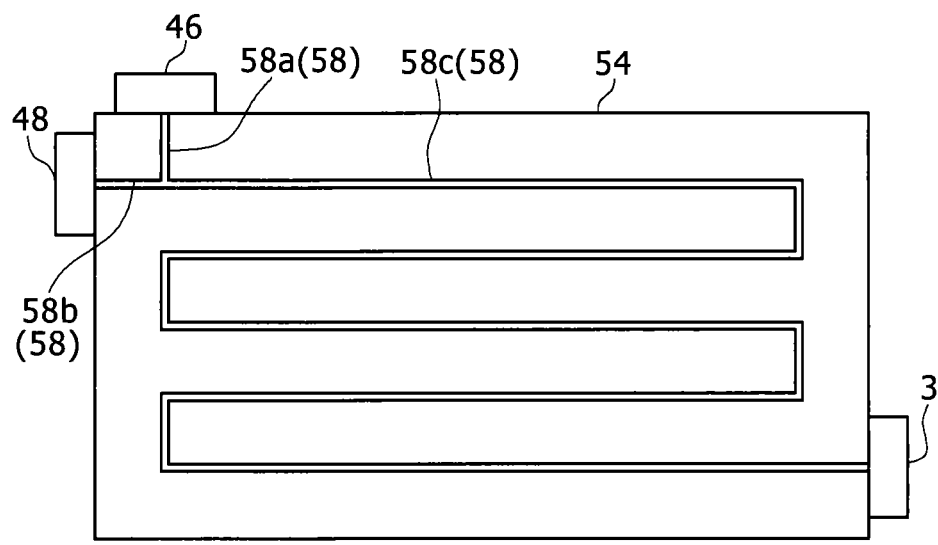
FIG. 3 is a plan view of an absorption plate constituting a laminated body of the absorption processing unit shown in FIG. 2.
Figure 4:
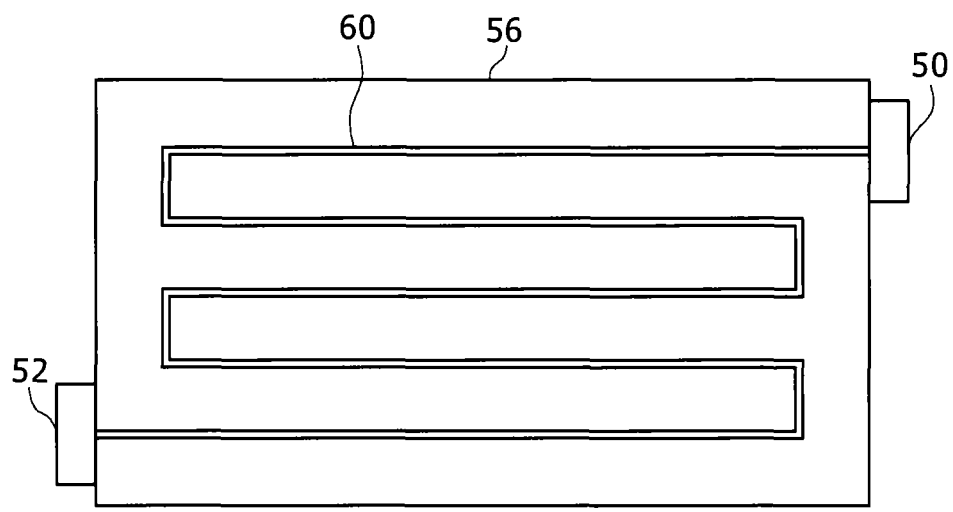
FIG. 4 is a plan view of a cooling medium plate constituting the laminated body of the absorption processing unit shown in FIG. 2.

The absorption plate 54 is a plate forming an absorption duct 58 (see FIG. 3). The absorption duct 58 is a microduct (microchannel) formed along one plate surface of the absorption plate 54. The absorption duct 58 causes the target component to be absorbed into the absorption liquid from the fluid to be processed while causing the flow of the fluid to be processed and the absorption liquid in a state of mutual contact. The absorption duct 58 is composed of a fluid to be processed introduction passage 58a, an absorption liquid introduction passage 58b, and a mixed fluid duct 58c. The fluid to be processed introduction passage 58a is a portion into which the fluid to be processed is introduced and flows therethrough. The absorption liquid introduction passage 58b is a portion into which the absorption liquid is introduced and flows therethrough. The mixed fluid duct 58c is a portion through which the fluid to be processed and the absorption liquid flow after the fluid to be processed and the absorption liquid join together.

The fluid to be processed introduction passage 58a has an inlet formed in one side surface among four side surfaces of the laminated body 44. The fluid to be processed introduction passage 58a extends toward the opposite side surface from the side surface of the laminated body 44 formed with the inlet.

The absorption liquid introduction passage 58b has an inlet formed in the side surface orthogonal to the side surface formed with the inlet of the fluid to be processed introduction passage 58a among four side surfaces of the laminated body 44. The absorption liquid introduction passage 58b extends toward the opposite side surface from the side surface of the laminated body 44 formed with the inlet. The fluid to be processed introduction passage 58a and the absorption liquid introduction passage 58b are linked to each other at the opposite side ends to the inlets thereof.

The mixed fluid duct 58c is linked to the ends at which the fluid to be processed introduction passage 58a and the absorption liquid introduction passage 58b are linked to each other. The mixed fluid duct 58c extends while being repeatedly folded between the side surface formed with the inlet of the absorption liquid introduction passage 58b of the laminated body 44 and the opposite side surface thereof. The mixed fluid duct 58c has an outlet in the opposite side surface of the side surface formed with the inlet of the absorption liquid introduction passage 58b.

In the absorption plate 54, microgrooves corresponding to the shape of the absorption duct 58 described above are formed. Openings of the microgrooves formed in one plate surface of the absorption plate 54 are sealed by other plates laminated on the plate surface, thereby the absorption duct 58 is formed.

The cooling medium plate 56 (see FIG. 4) is a plate forming a cooling medium duct 60. The cooling medium duct 60 is a duct for cooling the fluid to be processed and absorption liquid flowing through the absorption duct 58 and causing the flow of a cooling medium for removing heat of absorption produced in connection with absorption of the target component into the absorption liquid from the fluid to be processed. The cooling medium duct 60 is a microduct (microchannel) formed along one plate surface of the cooling medium plate 56. The cooling medium duct 60 has an inlet in the same side surface as the side surface of the laminated body 44 formed with the exit of the mixed fluid duct 60. The cooling medium duct 60 extends while being repeatedly folded between the side surface of the laminated body 44 formed with the inlet and the opposite side surface thereof. In addition, the cooling medium duct 60 has an outlet in the opposite side surface to the side surface formed with the inlet of the cooling medium duct 60, that is, the same side surface as the side surface formed with the inlet of the absorption liquid introduction passage 58b, of the laminated body 44.

In the cooling medium plate 56, microgrooves corresponding to the shape of the cooling medium duct 60 described above are formed. Openings of the microgrooves formed in one plate surface of the cooling medium plate 56 are sealed by other plates laminated on the plate surface, thereby the cooling medium duct 60 is formed.

In the laminated body 44, the absorption plate 54 and the cooling medium plate 56 are alternately and repeatedly laminated. Thereby, within the laminated body 44, the absorption duct 58 and the cooling medium duct 60 are disposed so as to be arranged alternately while being spaced from each other in the laminated direction of the plates. Within the laminated body 44, the respective cooling medium ducts 60 are disposed at positions at which heat exchange is possible with respect to the adjacent absorption duct 58.

The fluid to be processed supply header 46 (see FIGS. 2 and 3) is attached to the side surface formed with the inlet of the fluid to be processed introduction passage 58a of the laminated body 44. The fluid to be processed supply header 46 is attached to the laminated body 44 so as to cover the inlets of the fluid to be processed introduction passages 58a of all the absorption ducts 58. The interior space of the fluid to be processed supply header 46 is communicated with the inlets of the respective fluid to be processed introduction passages 58a. To the fluid to be processed supply header 46, a fluid to be processed supply pipe 23 is connected. In addition, the end opposite to the fluid to be processed supply header 46 of the fluid to be processed supply pipe 23 is connected to a discharge port of the fluid to be processed delivery unit 6 (see FIG. 1). The fluid to be processed delivery unit 6 delivers the fluid to be processed to the absorption processing unit 2 side. The fluid to be processed delivery unit 6 has a function as a compressor for compressing the fluid to be processed and a function as a blower for delivering the fluid to be processed. Into the interior space of the fluid to be processed supply header 46, the fluid to be processed after compression delivered through the fluid to be processed supply pipe 23 from the fluid to be processed delivery unit 6 is introduced. The fluid to be processed supply header 46 distributes and supplies the fluid to be processed after compression introduced into the interior space thereof to the fluid to be processed introduction passages 58a of the respective absorption ducts 58.

The absorption liquid supply header 48 (see FIGS. 2 and 3) is attached to the side surface formed with the inlet of the absorption liquid introduction passage 58b of the laminated body 44. The absorption liquid supply header 48 is attached to the laminated body 44 so as to cover the inlets of the absorption liquid introduction passages 58b of all the absorption ducts 58. The interior space of the absorption liquid supply header 48 is communicated with the inlets of the respective absorption liquid introduction passages 58b. To the absorption liquid supply header 48, an absorption liquid supply pipe 24 is connected. In addition, the end opposite to the absorption liquid supply header 48 of the absorption liquid supply pipe 24 is connected to a discharge port of the absorption liquid delivery unit 8 (see FIG. 1). The absorption liquid delivery unit 8 is a liquid delivery pump for delivering the absorption liquid to the absorption processing unit 2 side. Into the interior space of the absorption liquid supply header 48, the absorption liquid delivered through the absorption liquid supply pipe 24 from the absorption liquid delivery unit 8 is introduced. The absorption liquid supply header 48 distributes and supplies the absorption liquid introduced into the interior space thereof to the absorption liquid introduction passages 58b of the respective absorption ducts 58.

The cooling medium supply header 50 (see FIGS. 2 and 4) is attached to the side surface formed with the inlet of the cooling medium duct 60 of the laminated body 44. The cooling medium supply header 50 is attached to the laminated body 44 so as to cover the inlets of all the cooling medium ducts 60. The interior space of the cooling medium supply header 50 is communicated with the inlets of the respective cooling medium ducts 60. To the cooling medium supply header 50, a cooling medium supply pipe 25 is connected. In addition, the end opposite to the cooling medium supply header 50 of the cooling medium supply pipe 25 is connected to a discharge port of the cooling medium delivery unit 10 (see FIG. 1). The cooling medium delivery unit 10 is a liquid delivery pump for delivering the cooling medium cooled to low temperature by a cooling device such as a cooling tower (not shown) to the absorption processing unit 2 side. Into the interior space of the cooling medium supply header 50, the cooling medium delivered through the cooling medium supply pipe 25 from the cooling medium delivery unit 10 is introduced. The cooling medium supply header 50 distributes and supplies the cooling medium introduced into the interior space thereof to the respective cooling medium ducts 60.

The cooling medium discharge header 52 (see FIGS. 2 and 4) is attached to the side surface formed with the outlet of the cooling medium duct 60 of the laminated body 44. The cooling medium discharge header 52 is attached to the laminated body 44 so as to cover the outlets of all the cooling medium ducts 60. The interior space of the cooling medium discharge header 52 is communicated with the outlets of the respective cooling medium ducts 60. To the cooling medium discharge header 52, a cooling medium discharge pipe 30 is connected. The cooling medium discharge header 52 recovers the cooling medium discharged from the outlets of the respective cooling medium ducts 60 and directs it to the cooling medium discharge pipe 30.

The post-absorption separation unit 3 (see FIGS. 2 and 3) separates the mixed fluid discharged from the outlets of the mixed fluid ducts 58c of the respective absorption ducts 58 by a specific gravity difference. The post-absorption separation unit 3 is attached to the side surface formed with the outlets of the respective mixed fluid ducts 58c of the laminated body 44. The post-absorption separation unit 3 is attached to the laminated body 44 so as to cover the outlets of all the mixed fluid ducts 58c. The post-absorption separation unit 3 has an interior space for separating the mixed fluid discharged from the outlets of the mixed fluid ducts 58c of the respective absorption ducts 58 into the fluid to be processed after the target component has been absorbed and the absorption liquid after having absorbed the target component by a specific gravity difference. The interior space of the post-absorption separation unit 3 is communicated with the outlets of the respective mixed fluid ducts 58c. The mixed fluid discharged from the outlets of the respective mixed fluid ducts 58c is stored in the interior space of the post-absorption separation unit 3 temporarily. The fluid to be processed after the target component has been absorbed is smaller in specific gravity than the absorption liquid after having absorbed the target component. Therefore, the mixed fluid stored in the interior space of the post-absorption separation unit 3 is naturally separated into the fluid to be processed whose specific gravity is small and the absorption liquid whose specific gravity is large. The absorption liquid whose specific gravity is large accumulates in the lower part of the post-absorption separation unit 3, and the fluid to be processed whose specific gravity is small accumulates on the upper side of the absorption liquid. In a case where the fluid to be processed is gas, the mixed fluid is a mixture of the gas that is the fluid to be processed and the absorption liquid, and the mixed fluid is subjected to gas-liquid separation within the post-absorption separation unit 3.

To the upper part of the post-absorption separation unit 3, that is, the portion in which the fluid to be processed after the target component has been absorbed accumulates, a fluid to be processed discharge pipe 26 (see FIG. 1) is connected. The fluid to be processed discharge pipe 26 is an example of a fluid to be processed discharge passage of the present invention. In addition, to the lower part of the post-absorption separation unit 3, that is, the portion in which the absorption liquid after having absorbed the target component accumulates, a post-absorption absorption liquid discharge pipe 28 is connected. The post-absorption absorption liquid discharge pipe 28 is an example of an absorption liquid discharge passage of the present invention. The fluid to be processed separated in the post-absorption separation unit 3 is discharged through the fluid to be processed discharge pipe 26 from the post-absorption separation unit 3. The absorption liquid separated in the post-absorption separation unit 3 is discharged through the post-absorption absorption liquid discharge pipe 28 from the post-absorption separation unit 3.

In the fluid to be processed discharge pipe 26, the first check valve 12 and the first pressure regulating valve 14 are provided. The first check valve 12 prevents the fluid to be processed flowing through the fluid to be processed discharge pipe 26 from reversely flowing to the post-absorption separation unit 3. The first pressure regulating valve 14 regulates the pressure within the fluid to be processed discharge pipe 26.

In addition, in the post-absorption absorption liquid discharge pipe 28, the second check valve 16 and the second pressure regulating valve 18 are provided. The second check valve 16 prevents the absorption liquid flowing through the post-absorption absorption liquid discharge pipe 28 from reversely flowing to the post-absorption separation unit 3. The second pressure regulating valve 18 regulates the pressure within the post-absorption absorption liquid discharge pipe 28. The first pressure regulating valve 14 and the second pressure regulating valve 18 perform pressure regulation so that the pressure of the fluid to be processed flowing through the fluid to be processed discharge pipe 26 and the pressure of the absorption liquid flowing through the post-absorption absorption liquid discharge pipe 28 become equal.

Figure 5:
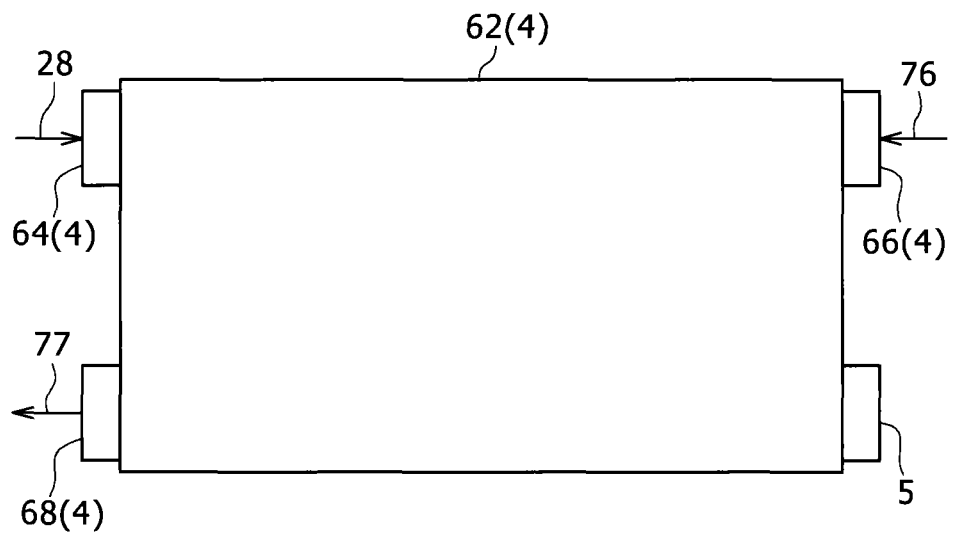
FIG. 5 is a plan view of a diffusion processing unit and a post-diffusion separation unit of the separation device shown in FIG. 1 viewed from above.

The diffusion processing unit 4 performs processing of diffusing the target component from the absorption liquid after having absorbed the target component in the absorption processing unit 2. The diffusion processing unit 4 has a laminated body 62 consisting of a lot of plates laminated vertically, an absorption liquid supply header 64, a heat medium supply header 66, and a heat medium discharge header 68. It should be noted that although illustrations of the respective headers 64, 66, 68 are omitted in FIG. 1 for the sake of simplicity, the respective headers 64, 66, 68 are attached around the laminated body 62 as shown in FIG. 5 that is a plan view of the diffusion processing unit 4 viewed from above.

In a lot of plates constituting the laminated body 62, a plurality of diffusion plates 70 (see FIG. 6) and a plurality of heat medium plates 71 (see FIG. 7) are included.

Figure 6:
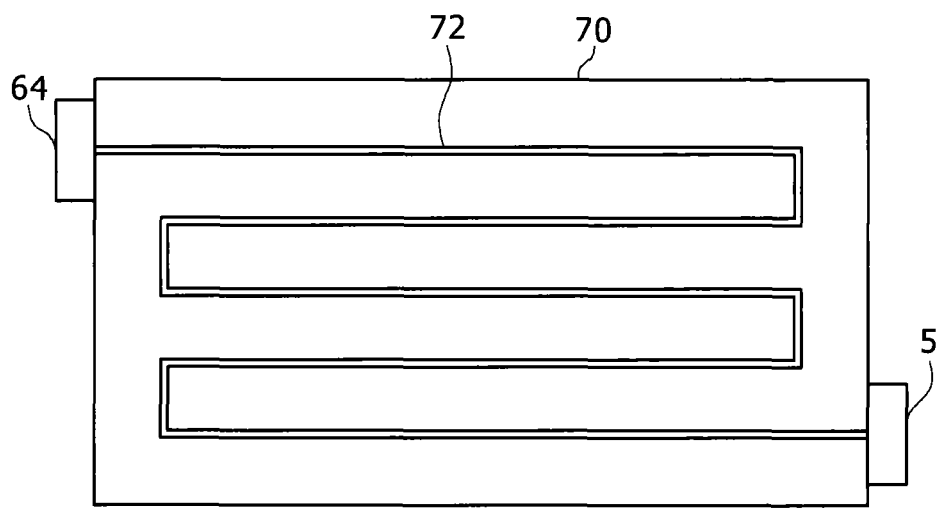
FIG. 6 is a plan view of a diffusion plate constituting a laminated body of the diffusion processing unit shown in FIG. 5.
Figure 7:
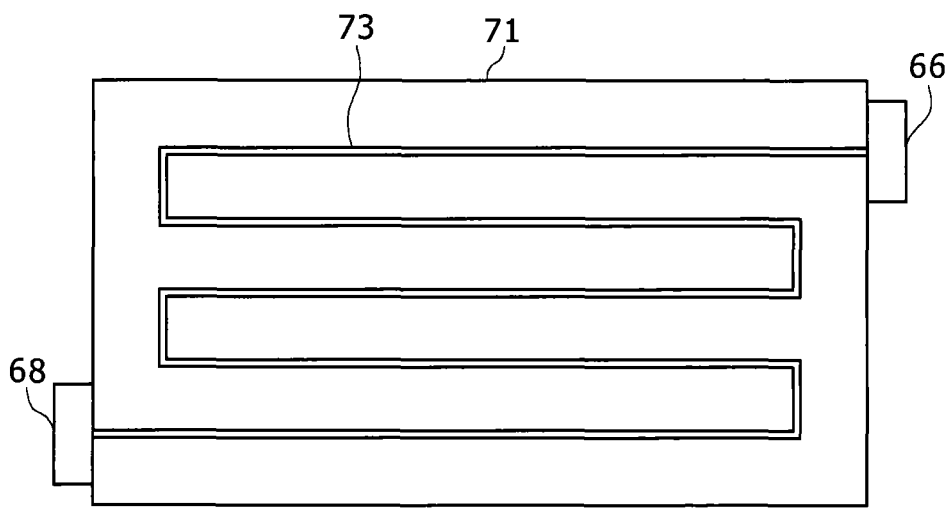
FIG. 7 is a plan view of a heat medium plate constituting the laminated body of the diffusion processing unit shown in FIG. 5.

The diffusion plate 70 is a plate forming a diffusion duct 72 (see FIG. 6). The diffusion duct 72 is a duct for causing the gas that is the target component to be diffused from the absorption liquid after having absorbed the target component while causing the absorption liquid to pass therethrough. The diffusion duct 72 is a microduct (microchannel) formed along one plate surface of the diffusion plate 70. The diffusion duct 72 has an inlet formed in one side surface among four side surfaces of the laminated body 62. The diffusion duct 72 extends while being repeatedly folded between the side surface of the laminated body 62 formed with the inlet and the opposite side surface thereof. In addition, the diffusion duct 72 has an outlet formed in the opposite side surface to the side surface formed with the inlet of the laminated body 62. In the diffusion plate 70, microgrooves corresponding to the shape of the diffusion duct 72 described above are formed. Openings of the microgrooves formed in one plate surface of the diffusion plate 70 are sealed by other plates laminated on the plate surface, thereby the diffusion duct 72 is formed.

The heat medium plate 71 (see FIG. 7) is a plate forming a heat medium duct 73. The heat medium duct 73 is a duct for causing the flow of a heating medium for heating the absorption liquid flowing through the diffusion duct 72 in order to diffuse the gas that is the target component from the absorption liquid. The heat medium duct 73 is a microduct (microchannel) formed along one plate surface of the heat medium plate 71. The heat medium duct 73 has an inlet in the same side surface as the side surface of the laminated body 62 formed with the exit of the diffusion duct 72. The heat medium duct 73 extends while being repeatedly folded between the side surface of the laminated body 62 formed with the inlet and the opposite side surface thereof. In addition, the heat medium duct 73 has an outlet in the opposite side surface to the side surface formed with the inlet of the heat medium duct 73, that is, the same side surface as the side surface formed with the outlet of the diffusion duct 72, of the laminated body 62. In the heat medium plate 71, microgrooves corresponding to the shape of the heat medium duct 73 described above are formed. Openings of the microgrooves formed in one plate surface of the heat medium plate 71 are sealed by other plates laminated on the plate surface, thereby the heat medium duct 73 is formed.

In the laminated body 62, the diffusion plate 70 and the heat medium plate 71 are alternately and repeatedly laminated. Thereby, within the laminated body 62, the diffusion duct 72 and the heat medium duct 73 are disposed so as to be arranged alternately while being spaced from each other in the laminated direction of the plates. Within the laminated body 62, the respective heat medium ducts 73 are disposed at positions at which heat exchange is possible with respect to the adjacent diffusion duct 72.

The absorption liquid supply header 64 (see FIGS. 5 and 6) is attached to the side surface formed with the inlet of the diffusion duct 72 of the laminated body 62. The absorption liquid supply header 64 is attached to the laminated body 62 so as to cover the inlets of all the diffusion ducts 72. The interior space of the absorption liquid supply header 64 is communicated with the inlets of the respective diffusion ducts 72. To the absorption liquid supply header 64, a post-absorption absorption liquid discharge pipe 28 is connected. Into the interior space of the absorption liquid supply header 64, the absorption liquid after having absorbed the target component separated in the post-absorption separation unit 3 is introduced through the post-absorption absorption liquid discharge pipe 28. The absorption liquid supply header 64 distributes and supplies the absorption liquid introduced into the interior space thereof to the respective diffusion ducts 72.

The heat medium supply header 66 (see FIGS. 5 and 7) is attached to the side surface formed with the inlet of the heat medium duct 73 of the laminated body 62. The heat medium supply header 66 is attached to the laminated body 62 so as to cover the inlets of all the heat medium ducts 73. The interior space of the heat medium supply header 66 is communicated with the inlets of the respective heat medium ducts 73. To the heat medium supply header 66, a heat medium supply pipe 76 is connected. In addition, the end opposite to the heat medium supply header 66 of the heat medium supply pipe 76 is connected to a discharge port of the heat medium delivery unit 11 (see FIG. 1). The heat medium delivery unit 11 is a liquid delivery pump for delivering the heat medium heated to high temperature by a heating device (not shown) to the diffusion processing unit 4 side. Into the interior space of the heat medium supply header 66, the heat medium delivered through the heat medium supply pipe 76 from the heat medium delivery unit 11 is introduced. The heat medium supply header 66 distributes and supplies the heat medium introduced into the interior space thereof to the respective heat medium ducts 73.

The heat medium discharge header 68 (see FIGS. 5 and 7) is attached to the side surface formed with the outlet of the heat medium duct 73 of the laminated body 62. The heat medium discharge header 68 is attached to the laminated body 62 so as to cover the outlets of all the heat medium ducts 73. The interior space of the heat medium discharge header 68 is communicated with the outlets of the respective heat medium ducts 73. To the heat medium discharge header 68, a heat medium discharge pipe 77 is connected. The heat medium discharge header 68 recovers the heat medium discharged from the outlets of the respective heat medium ducts 73 and directs it to the heat medium discharge pipe 77.

The post-diffusion separation unit 5 (see FIGS. 5 and 6) separates the mixed fluid of the absorption liquid and the gas that is the target component discharged from the outlets of the respective diffusion ducts 72 into the gas that is the target component and the absorption liquid by a specific gravity difference. The post-diffusion separation unit 5 is attached to the side surface formed with the outlet of the diffusion duct 72 of the laminated body 62. The post-diffusion separation unit 5 is attached to the laminated body 62 so as to cover the outlets of all the diffusion ducts 72. The interior space of the post-diffusion separation unit 5 that performs separation by a specific gravity difference is communicated with the outlets of the respective diffusion ducts 72. The mixed fluid discharged from the outlets of the respective diffusion ducts 72 is stored in the interior space of the post-diffusion separation unit 5 temporarily. The mixed fluid stored therein is naturally separated into the gas that is the target component whose specific gravity is small and the absorption liquid whose specific gravity is large. Then, the separated absorption liquid accumulates in the lower part within the post-diffusion separation unit 5, and the separated gas that is the target component accumulates on the upper side of the absorption liquid within the post-diffusion separation unit 5.

To the upper part of the post-diffusion separation unit 5, that is, the portion in which the gas that is the target component accumulates, a target component discharge pipe 78 (see FIG. 1) is connected. In addition, to the lower part of the post-diffusion separation unit 5, that is, the portion in which the absorption liquid accumulates, a post-diffusion absorption liquid discharge pipe 79 is connected. The gas that is the target component separated in the post-diffusion separation unit 5 is discharged through the target component discharge pipe 78 from the post-diffusion separation unit 5. The absorption liquid after having discharged the target component separated in the post-diffusion separation unit 5 is discharged through the post-diffusion absorption liquid discharge pipe 79 from the post-diffusion separation unit 5.

In the target component discharge pipe 78, the third check valve 19 and the third pressure regulating valve 20 are provided. The third check valve 19 prevents the gas that is the target component flowing through the target component discharge pipe 78 from reversely flowing to the post-diffusion separation unit 5. The third pressure regulating valve 20 regulates the pressure within the target component discharge pipe 78.

In addition, in the post-diffusion absorption liquid discharge pipe 79, the fourth check valve 21 and the fourth pressure regulating valve 22 are provided. The fourth check valve 21 prevents the absorption liquid flowing through the post-diffusion absorption liquid discharge pipe 79 from reversely flowing to the post-diffusion separation unit 5. The fourth pressure regulating valve 22 regulates the pressure within the post-diffusion absorption liquid discharge pipe 79. The third pressure regulating valve 20 and the fourth pressure regulating valve 22 perform pressure regulation so that the pressure of the gas that is the target component flowing through the target component discharge pipe 78 and the pressure of the absorption liquid flowing through the post-diffusion absorption liquid discharge pipe 79 become equal.

The first control unit 32 (see FIG. 1) controls the flow rate of the cooling medium delivered by the cooling medium delivery unit 10, and thereby controls the temperature of the cooling medium flowing through the cooling medium duct 60 of the absorption processing unit 2. Concretely, the first control unit 32 controls the temperature of the cooling medium flowing through the cooling medium duct 60 so that the temperature of the cooling medium is maintained in a range of not less than 10° C. and not more than 40° C. To the cooling medium supply pipe 25, the entry side cooling medium temperature sensor 36 that detects the temperature of the cooling medium flowing through the pipe 25, that is, the temperature of the cooling medium introduced into the cooling medium duct 60 is connected. To the cooling medium discharge pipe 30, the exit side cooling medium temperature sensor 38 that detects the temperature of the cooling medium flowing through the pipe 30, that is, the temperature of the cooling medium discharged from the cooling medium duct 60 is connected. The entry side cooling medium temperature sensor 36 and the exit side cooling medium temperature sensor 38 send the data of the detected temperature of the cooling medium to the first control unit 32 respectively. The first control unit 32 controls the flow rate of the cooling medium delivered by the cooling medium delivery unit 10 based on the received temperature data of the cooling medium. Specifically, if the temperature of the cooling medium detected by the exit side cooling medium temperature sensor 38 is higher than 40° C., the first control unit 32 causes the cooling medium delivery unit 10 to increase the flow rate of the cooling medium so that the detected temperature becomes to not more than 40° C. In addition, if the temperature of the cooling medium detected by the entry side cooling medium temperature sensor 36 is lower than 10° C., the first control unit 32 causes the cooling medium delivery unit 10 to decrease the flow rate of the cooling medium so that the detected temperature becomes to not less than 10° C.

The second control unit 34 controls the flow rate of the heat medium delivered by the heat medium delivery unit 11, and thereby controls the temperature of the heat medium flowing through the heat medium duct 73 of the diffusion processing unit 4. Concretely, the second control unit 34 controls the temperature of the heat medium flowing through the heat medium duct 73 so that the temperature of the heat medium is maintained in a range of not less than 70° C. and not more than 95° C. To the heat medium supply pipe 76, the entry side heat medium temperature sensor 40 that detects the temperature of the heat medium flowing through the pipe 76, that is, the temperature of the heat medium introduced into the heat medium duct 73 is connected. To the heat medium discharge pipe 77, the exit side heat medium temperature sensor 42 that detects the temperature of the heat medium flowing through the pipe 77, that is, the temperature of the heat medium discharged from the heat medium duct 73 is connected. The entry side heat medium temperature sensor 40 and the exit side heat medium temperature sensor 42 send the data of the detected temperature of the heat medium to the second control unit 34 respectively. The second control unit 34 controls the flow rate of the heat medium delivered by the heat medium delivery unit 11 based on the received temperature data of the heat medium. Specifically, if the temperature of the heat medium detected by the exit side heat medium temperature sensor 42 is lower than 70° C., the second control unit 34 causes the heat medium delivery unit 11 to increase the flow rate of the heat medium so that the detected temperature becomes to not less than 70° C. In addition, if the temperature of the heat medium detected by the entry side heat medium temperature sensor 40 is higher than 95° C., the second control unit 34 causes the heat medium delivery unit 11 to decrease the flow rate of the heat medium so that the detected temperature becomes to not more than 95° C.

Next, a separation method of the target component from the fluid to be processed using the separation device 1 according to the present embodiment will be described.

A separation method according to the present embodiment is used for separating and recovering $CO_2$ from an exhaust gas discharged from a thermal power plant or various combustion engines, for example. In this case, the exhaust gas corresponds to the fluid to be processed, and $CO_2$ corresponds to the target component. The exhaust gas is an acidic gas. As the absorption liquid for absorbing $CO_2$ from the exhaust gas, a basic liquid that selectively absorbs $CO_2$ from the exhaust gas, such as an amine-based solvent, an aqueous solution of the amine-based solvent, or an ionic liquid, is used. It should be noted that $CO_2$ in the exhaust gas can be absorbed even if water is used instead of a basic liquid as the absorption liquid. Hereinafter, assuming that the fluid to be processed is the exhaust gas and the target component is $CO_2$, the separation method according to the present embodiment will be described.

First, the fluid to be processed delivery unit 6 (see FIG. 1) compresses and delivers the exhaust gas. The delivered exhaust gas after compression is introduced into the fluid to be processed introduction passages 58a (see FIG. 3) of the respective absorption ducts 58 within the absorption processing unit 2. On the other hand, the absorption liquid delivery unit 8 delivers the absorption liquid. The delivered absorption liquid is introduced into the absorption liquid introduction passages 58b (see FIG. 3) of the respective absorption ducts 58 within the absorption processing unit 2. In addition, the cooling medium delivery unit 10 delivers the low-temperature cooling medium. The delivered cooling medium is introduced into the respective cooling medium ducts 60 (see FIG. 4) within the absorption processing unit 2.

The exhaust gas introduced into the fluid to be processed introduction passage 58a and the absorption liquid introduced into the absorption liquid introduction passage 58b join at the connecting points of the fluid to be processed introduction passage 58a and the absorption liquid introduction passage 58b. The joined exhaust gas and absorption liquid become a mixed fluid in a state of a slug flow in which the slag of the exhaust gas and the slag of the absorption liquid flow in contact with each other, and flow to the downstream side through the mixed fluid duct 58c. In this process, $CO_2$ is absorbed into the slag of the absorption liquid from the slag of the exhaust gas (an absorption step). At this time, physical absorption in which $CO_2$ is simply dissolved into the absorption liquid from the exhaust gas, or chemical absorption in which $CO_2$ in the exhaust gas is absorbed into the absorption liquid by chemically reacting with the absorption liquid occurs.

When $CO_2$ is absorbed into the absorption liquid from the exhaust gas, heat of absorption is correspondingly produced. As a result, the temperature of the exhaust gas and absorption liquid flowing through the mixed fluid duct 58c increases. At this time, the exhaust gas and the absorption liquid are cooled by heat exchange between the cooling medium flowing through the cooling medium duct 60 and the exhaust gas and absorption liquid flowing through the mixed fluid duct 58c (a cooling step). Thereby, temperature rising of the exhaust gas and absorption liquid flowing through the mixed fluid duct 58c is suppressed.

As described above, the first control unit 32 controls the delivery flow rate of the cooling medium by the cooling medium delivery unit 10 (the liquid delivery pump) based on the data of the detected temperature by the entry side cooling medium temperature sensor 36 and the data of the detected temperature by the exit side cooling medium temperature sensor 38, and thereby controls the temperature of the cooling medium flowing through the cooling medium duct 60 so that the temperature of the cooling medium is maintained in a range of not less than 10° C. and not more than 40° C. The temperature of the cooling medium flowing through the cooling medium duct 60 is maintained in such a temperature range, thereby the exhaust gas and absorption liquid flowing through the mixed fluid duct 58c are cooled to a temperature suitable for absorption of $CO_2$ into the absorption liquid.

The mixed fluid having flowed through the respective mixed fluid ducts 58c is discharged to the interior space of the post-absorption separation unit 3 from the outlets of the respective mixed fluid ducts 58c, and is temporarily stored in the interior space. In the interior space, the mixed fluid is subjected to gas-liquid separation into the exhaust gas after $CO_2$ has been absorbed by the absorption liquid and the absorption liquid after having absorbed $CO_2$ by a specific gravity difference (a post-absorption separation step).

The exhaust gas after $CO_2$ has been absorbed is discharged through the fluid to be processed discharge pipe 26 from the post-absorption separation unit 3. The absorption liquid after having absorbed $CO_2$ is discharged through the post-absorption absorption discharge pipe 28 from the post-absorption separation unit 3. The pressure of the exhaust gas flowing through the fluid to be processed discharge pipe 26 and the pressure of the absorption liquid flowing through the post-absorption absorption liquid discharge pipe 28 are regulated so as to become mutually equal pressure and are held, by the first pressure regulating valve 14 and the second pressure regulating valve 18.

The absorption liquid flowing through the post-absorption absorption liquid discharge pipe 28 is introduced into the respective diffusion ducts 72 (see FIG. 6) within the diffusion processing unit 4. On the other hand, the heat medium delivery unit 11 delivers the high-temperature heat medium, and the delivered heat medium is introduced into the respective heat medium ducts 73 (see FIG. 7) within the diffusion processing unit 4. The absorption liquid introduced into the respective diffusion ducts 72 is heated by heat exchange with the heat medium flowing through the adjacent heat medium duct 73 while flowing to the downstream side through the diffusion ducts 72. The absorption liquid flowing through the respective diffusion ducts 72 diffuses $CO_2$ gas in connection with the heating of it (a diffusion step).

As described above, the second control unit 34 controls the delivery flow rate of the heat medium by the heat medium delivery unit 11 (the liquid delivery pump) based on the data of the detected temperature by the entry side heat medium temperature sensor 40 and the data of the detected temperature by the exit side heat medium temperature sensor 42, and thereby controls the temperature of the heat medium flowing through the heat medium duct 73 so that the temperature of the heat medium is maintained in a range of not less than 70° C. and not more than 95° C. The temperature of the heat medium flowing through the heat medium duct 73 is maintained in such a temperature range, thereby the absorption liquid flowing through the diffusion duct 72 is heated to a temperature suitable for diffusion of $CO_2$ from the absorption liquid.

The absorption liquid having flowed through the respective diffusion ducts 72 and the $CO_2$ gas diffused from the absorption liquid are discharged to the interior space of the post-diffusion separation unit 5 from the outlets of the respective diffusion ducts 72 in a state of mutual contact, and are temporarily stored in the interior space. In the interior space, the mixed fluid is subjected to gas-liquid separation into $CO_2$ gas and the absorption liquid by a specific gravity difference (a post-diffusion separation step).

$CO_2$ gas is discharged through the target component discharge pipe 78 from the post-diffusion separation unit 5 and is recovered. In addition, the absorption liquid is discharged through the post-diffusion absorption liquid discharge pipe 79 from the post-diffusion separation unit 5 and is recovered. The pressure of the $CO_2$ gas flowing through the target component discharge pipe 78 and the pressure of the absorption liquid flowing through the post-diffusion absorption liquid discharge pipe 79 are regulated so as to become mutually equal pressure and are held, by the third pressure regulating valve 20 and the fourth pressure regulating valve 22.

In such a manner, the separation method of $CO_2$ from the exhaust gas according to the present embodiment is performed.

Next, a reduction effect of the absorption liquid amount and the recovery energy obtained by the separation method of the present embodiment will be described.

Figure 8:
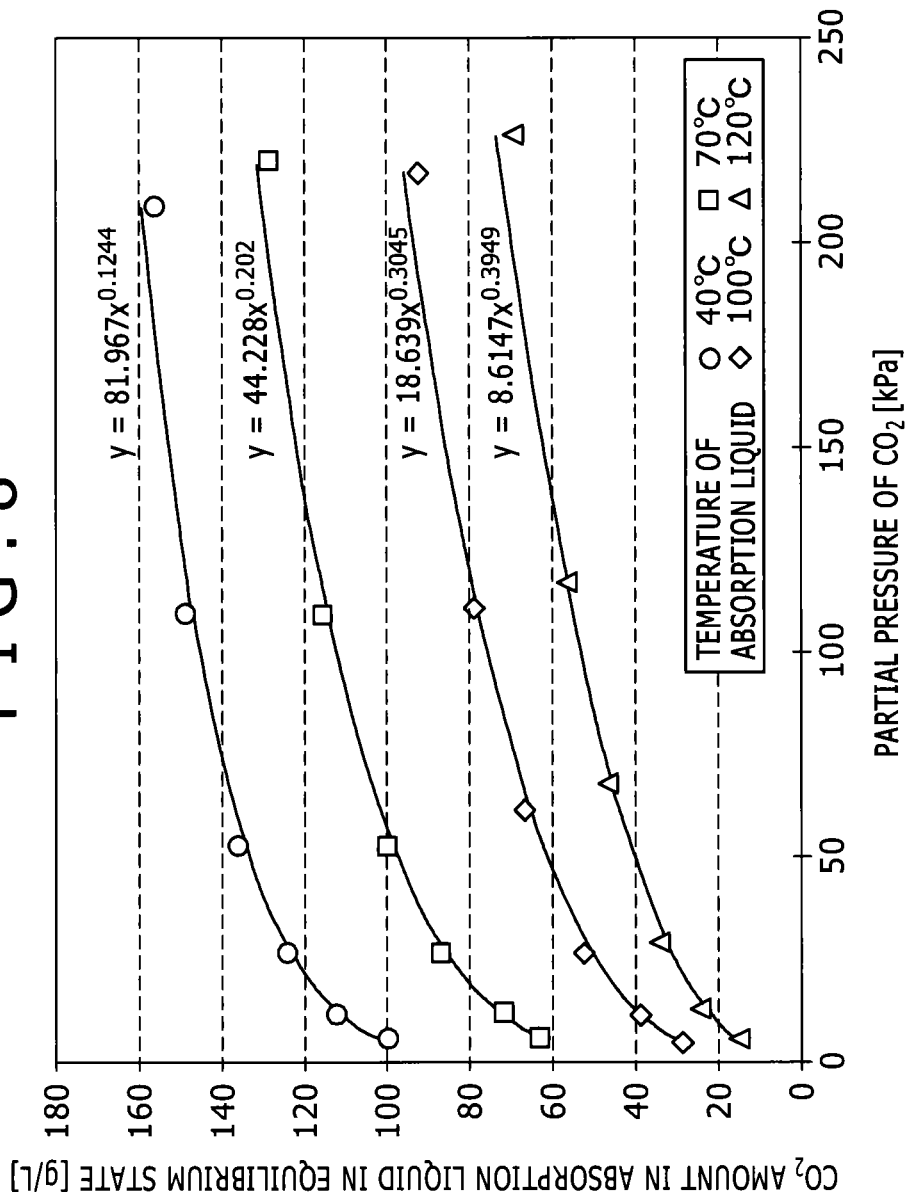
FIG. 8 is a view showing a correlation between the amount of $CO_2$ and the partial pressure of $CO_2$ in an absorption liquid in an equilibrium state.

In FIG. 8, a correlation between the amount of $CO_2$ and the partial pressure of $CO_2$ in the absorption liquid in an equilibrium state in cases where the temperature of the absorption liquid is the respective temperatures of 40° C., 70° C., 100° C., and 120° C. is shown. By use of the data of the correlation, in a case where a mixed gas as the fluid to be processed containing $CO_2$ at a concentration of 20 vol % and the absorption liquid are introduced into the absorption duct of the absorption processing unit, the amount of $CO_2$ absorbed into the absorption liquid (the absorbed amount of $CO_2$) was calculated. In this calculation, the gas-liquid ratio within the absorption duct, that is, the volume ratio of the mixed gas and the absorption liquid flowing through the absorption duct was set so that the absorption rate of $CO_2$ absorbed into the absorption liquid from the mixed gas becomes about 90%.

Further, in order for diffusing $CO_2$ gas from the absorption liquid having absorbed $CO_2$ in this way, a heat quantity necessary for heating the absorption liquid to 100° C. was calculated. Concretely, a sum of the heat of absorption of $CO_2$ and the sensible heat of the absorption liquid was calculated as the necessary heat quantity. In addition, as a specific heat of the absorption liquid used for calculation of the sensible heat of the absorption liquid, the specific heat 3.6 kJ/kg of 30 wt % monoethanolamine aqueous solution that is a typical absorption liquid was used.

When the absorption liquid is heated to 100° C. at ordinary pressure to diffuse $CO_2$ gas and diffusion is reached to an equilibrium state, the concentration of $CO_2$ in the absorption liquid is reduced to 30 g/L as can be seen from FIG. 8. Based on this relation, by subtracting the concentration (30 g/L) of $CO_2$ in the absorption liquid after the absorption step from the concentration of $CO_2$ in the absorption liquid before the diffusion step, that is, the concentration of $CO_2$ in the absorption liquid after the absorption step, the amount of $CO_2$ recovered after being diffused from the absorption liquid during the diffusion step was calculated. Then, by dividing the necessary heat quantity by the calculated amount of $CO_2$ recovered, the recovery energy of $CO_2$ was calculated. The recovery energy of $CO_2$ means a heat quantity required for heating of the absorption liquid in the diffusion step in order to recover $CO_2$ of unit amount. The above calculations were performed under a plurality of conditions in which a combination of the temperature and the pressure of the absorption liquid during $CO_2$ absorption is changed. The results obtained by the calculations are shown in FIG. 9.

Figure 9:
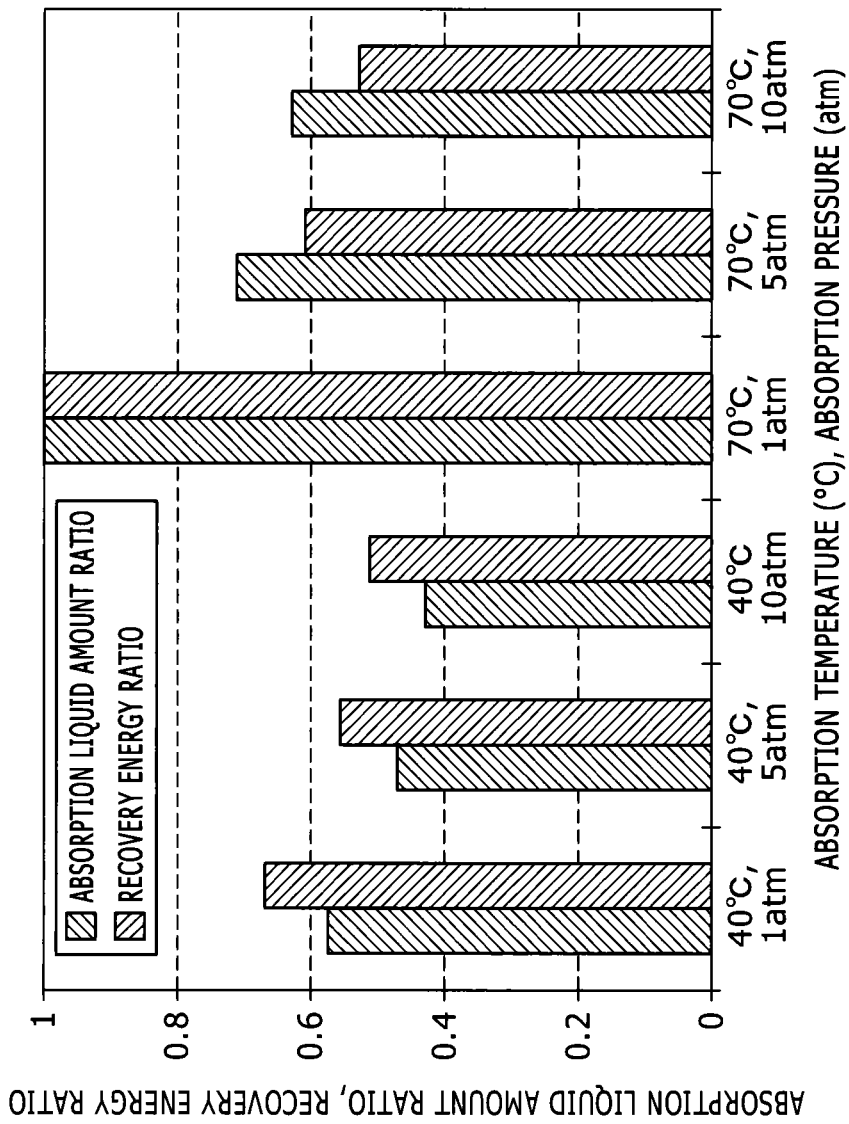
FIG. 9 is a view showing the absorption liquid amount ratio and the recovery energy ratio under the respective conditions of different absorption temperature and absorption pressures.

In FIG. 9, the absorption liquid amount ratio and the recovery energy ratio in cases where the temperature (absorption temperature) of the absorption liquid and the pressure (absorption pressure) of the absorption liquid during $CO_2$ absorption are set to the respective values are shown. The absorption liquid amount ratio of each case shows, on the basis of the liquid amount of the necessary absorption liquid in a case where the absorption step is performed under the basis condition in which the absorption temperature is 70° C. and the absorption pressure is 1 atm, the ratio of the liquid amount of the absorption liquid necessary for each case to the basis liquid amount. In addition, the recovery energy ratio of each case shows, on the basis of the necessary recovery energy in a case where the absorption step is performed under the basis condition, the ratio of the recovery energy necessary for each case to the basis recovery energy.

The results in FIG. 9 reveal that, by increasing the absorption pressure and decreasing the absorption temperature, that is, preventing temperature rising of the absorption liquid due to the heat of absorption by use of the separation method using the separation device of the present embodiment, the necessary absorption liquid amount and recovery energy can be significantly reduced.

In the present embodiment, the fluid to be processed and the absorption liquid are cooled by causing the flow through the cooling medium duct 60 of a cooling medium having a lower temperature than that of the fluid to be processed and the absorption liquid, and causing heat exchange between the fluid to be processed and absorption liquid flowing through the absorption duct 58 and the cooling medium. Therefore, it is possible to remove the heat of absorption produced in the absorption step and prevent a decrease in the absorbed amount of the target component per unit liquid amount of the absorption liquid.

Moreover, in the present embodiment, the absorption liquid is cooled by causing heat exchange between the absorption liquid flowing through the absorption duct 58 that is the microduct provided within the absorption processing unit 2 and the cooling medium flowing through the cooling medium duct 60 that is the microduct provided within the same absorption processing unit 2. Therefore, compared to the case where the absorption liquid within the conventional absorption tower is cooled from the outside in the absorption tower, it is possible to cool the entire absorption liquid flowing through the cooling medium duct 60 successfully. Therefore, it is possible to prevent a decrease in the absorbed amount of the target component per unit liquid amount of the absorption liquid more effectively. As a result, it is possible to separate the target component from the fluid to be processed with an excellent separation efficiency.

Then, in the present embodiment, since an excellent separation efficiency of the target component can be obtained, there is no need to increase the amount of the absorption liquid in order to supplement a decrease in separation efficiency as in conventional manner. Therefore, it is possible to prevent an increase in size of the absorption processing unit 2. Further, since the absorption duct 58 and the cooling medium duct 60 are both the microducts provided within the same absorption processing unit 2, it is possible to miniaturize the absorption processing unit 2. Therefore, it is possible to miniaturize the separation device 1.

In addition, in the present embodiment, the absorption processing unit 2 and the post-absorption separation unit 3 are integrated with each other, and the outlet of the absorption duct 58 and the interior space of the post-absorption separation unit 3 are communicated with each other. Therefore, as in the case where a separator is separately provided apart from the absorption processing unit, there is no need to provide a pipe linking the outlet of the absorption duct and the separator. Therefore, it is possible to reduce the manufacturing cost of the separation device 1. In addition, in the case where the outlet of the absorption duct and the separator are linked by a pipe, pressure loss due to the pipe is generated, but in the present embodiment, the outlet of the absorption duct 58 and the interior space of the post-absorption separation unit 3 are directly communicated with each other, therefore it is possible to prevent the occurrence of such a pressure loss due to the pipe.

In addition, in the present embodiment, by pressure control by means of the first pressure regulating valve 14 and the second pressure regulating valve 18, it is possible to prevent the fluid to be processed separated in the interior space of the post-absorption separation unit 3 from flowing into the post-absorption absorption liquid discharge pipe 28 and to prevent the absorption liquid separated in the interior space of the post-absorption separation unit 3 from flowing into the fluid to be processed discharge pipe 26. In addition, by preventing the reverse flow by means of the first check valve 12 and the second check valve 16, the influence of the process performed on the downstream side than the check valves 12, 16 can be suppressed from exerting on the post-absorption separation unit 3 and the absorption duct 58 on the upstream side than the check valves 12, 16.

In addition, in the present embodiment, heat exchange between the heat medium flowing through the heat medium duct 73 of the diffusion processing unit 4 and the absorption liquid separated in the post-absorption separation unit 3 after having absorbed the target component in the absorption duct 58 is caused while causing the flow of the absorption liquid through the diffusion duct 72 of the diffusion processing unit 4. Therefore, the gas that is the target component is caused to be diffused from the absorption liquid, and thereafter the gas that is the target component can be subjected to gas-liquid separation from the absorption liquid in the post-diffusion separation unit 5 and recovered. Then, in the present embodiment, the absorption liquid absorbs the target component while being cooled during the absorption step in the absorption processing unit 2, thereby the amount of the target component included in the absorption liquid introduced into the diffusion duct 72 is increased, and the temperature of the absorption liquid introduced into the diffusion duct 72 can be suppressed low. Therefore, even if the temperature of the heat medium to be flowing through the heat medium duct 73 in the diffusion processing unit 4 is not very high, the gas that is the target component can be sufficiently diffused from the absorption liquid. Accordingly, it is possible to perform diffusion and recovery of the target component from the absorption liquid successfully while reducing the energy necessary for heating the heat medium.

It should be noted that the embodiments disclosed herein are to be considered in all the respects as illustrative and not restrictive. The scope of the present invention is indicated not by the aforementioned description of embodiments but by the claims, and it is intended that all changes within the equivalent meaning and scope to the claims may be included therein.

For example, the configuration such as the shape and the number of the absorption duct and the cooling medium duct within the laminated body of the absorption processing unit, and the configuration such as the shape and the number of the diffusion duct and the heat medium duct within the laminated body of the diffusion processing unit are not limited to those indicated by the above embodiments. For example, the absorption duct, the cooling medium duct, the diffusion duct, and the heat medium duct may be provided so as to be arranged in plural along the plate surfaces of the respective plates constituting them, respectively. In this case, it is possible to increase the processing capacity of the separation device for separating the target component from the fluid to be processed. In addition, the shape of the absorption duct, the cooling medium duct, the diffusion duct, and the heat medium duct may not necessarily be the shape extending while being repeatedly folded. The shape of these ducts may be the shape linearly extending from the inlet to the outlet, or the shape having a bent portion or a few bent portions.

In addition, the fluid to be processed may be a mixed gas other than the exhaust gas. The target component may be a component other than $CO_2$ included in the fluid to be processed. In addition, as the absorption liquid, the liquid capable of selectively absorbing the target component in the fluid to be processed is used. Therefore, if the type of the fluid to be processed or the type of the target component is changed, the liquid capable of appropriately absorbing the target component in response to the type thereof is selected as the absorption liquid. Accordingly, the absorption liquid is not necessarily limited to water, an amine-based solvent, an aqueous solution of the amine-based solvent, or an ionic liquid mentioned above.

In addition, the temperature data used by the first control unit for controlling the temperature of the cooling medium flowing through the cooling medium duct by controlling the delivered flow rate of the cooling medium from the cooling medium delivery unit may not necessarily be the detected temperature of the cooling medium at the inlet side of the cooling medium duct and the detected temperature of the cooling medium at the outlet side of the cooling medium duct described above. For example, the temperature of the cooling medium within the cooling medium duct may be detected by a temperature sensor, and the control of the cooling medium delivery unit may be performed by the first control unit based on the detected temperature of the temperature sensor. In addition, the temperature of the absorption liquid flowing through the absorption duct may be detected by a temperature sensor, and the control of the cooling medium delivery unit may be performed by the first control unit based on the detected temperature of the temperature sensor. In addition, the temperature data used by the second control unit for controlling the temperature of the heat medium flowing through the heat medium duct by controlling the delivered flow rate of the heat medium from the heat medium delivery unit may not necessarily be the detected temperature of the heat medium at the inlet side of the heat medium duct and the detected temperature of the heat medium at the outlet side of the heat medium duct described above. For example, the temperature of the heat medium within the heat medium duct may be detected by a temperature sensor, and the control of the heat medium delivery unit may be performed by the second control unit based on the detected temperature of the temperature sensor. In addition, the temperature of the absorption liquid flowing through the diffusion duct may be detected by a temperature sensor, and the control of the heat medium delivery unit may be performed by the second control unit based on the detected temperature of the temperature sensor.

Summary of Embodiments

The above embodiments are summarized as follows.

The separation method according to the above embodiment is a method of separating a target component as a separation object from a fluid to be processed, the method including: a preparation step for preparing a separation device including an absorption processing unit for absorbing the target component in the fluid to be processed into an absorption liquid, the absorption processing unit having therein an absorption duct that is a microduct, and a cooling medium duct that is a microduct disposed at a position at which heat exchange is possible with the absorption duct; an absorption step for causing the fluid to be processed and the absorption liquid to pass through the absorption duct in a state of mutual contact, thus causing the target component to be absorbed into the absorption liquid from the fluid to be processed during the process of passing through; a cooling step for cooling the fluid to be processed and the absorption liquid by means of causing the flow through the cooling medium duct of a cooling medium having a lower temperature than that of the fluid to be processed and absorption liquid flowing through the absorption duct, and causing heat exchange between the fluid to be processed and absorption liquid flowing through the absorption duct and the cooling medium; and a post-absorption separation step for separating, into the fluid to be processed and the absorption liquid, the mixed fluid of the fluid to be processed after the target component has been absorbed by the absorption liquid during the absorption step and the absorption liquid after having absorbed the target component.

In the separation method, during the cooling step, the fluid to be processed and the absorption liquid are cooled by causing the flow through the cooling medium duct of the cooling medium having a lower temperature than that of the fluid to be processed and absorption liquid, and causing heat exchange between the fluid to be processed and absorption liquid flowing through the absorption duct and the cooling medium. Therefore, it is possible to remove the heat of absorption produced in the absorption step. As a result, it is possible to prevent a decrease in the absorbed amount of the target component per unit liquid amount of the absorption liquid.

Moreover, in the separation method, since the fluid to be processed and the absorption liquid are cooled by causing heat exchange between the fluid to be processed and absorption liquid flowing through the absorption duct that is the microduct provided within the absorption processing unit and the cooling medium flowing through the cooling medium duct that is the microduct provided within the same absorption processing unit, a good cooling effect is obtained.

Concretely, if trying to cool the absorption liquid in order to prevent the absorbed amount of the target component by the absorption liquid during the conventional absorption step in the absorption tower, the absorption liquid within the absorption tower is cooled from the outside, and therefore the absorption liquid is not sufficiently cooled, especially in the central part within the cooling tower. As a result, the cooling effect is decreased.

In contrast, in the separation method according to the above embodiment, the fluid to be processed and the absorption liquid are cooled by causing heat exchange between the fluid to be processed and absorption liquid flowing through the absorption duct that is the microduct provided within the absorption processing unit and the cooling medium flowing through the cooling medium duct that is the microduct provided within the same absorption processing unit, thereby large cooling unevenness in the absorption liquid is not caused like the cooling in the absorption tower. As a result, it is possible to cool the entire absorption liquid flowing through the absorption duct successfully.

Therefore, it is possible to prevent a decrease in the absorbed amount of the target component per unit liquid amount of the absorption liquid more effectively, and as a result, it is possible to separate the target component from the fluid to be processed with an excellent separation efficiency.

Then, in the separation method, since an excellent separation efficiency of the target component can be obtained by the cooling of the absorption liquid as described above, there is no need to increase the amount of the absorption liquid in order to supplement a decrease in separation efficiency as in conventional manner.

Therefore, it is possible to prevent an increase in size of the absorption processing unit. Further, since the absorption duct and the cooling medium duct are both the microducts provided within the same absorption processing unit, it is possible to miniaturize the absorption processing unit. Therefore, it is possible to miniaturize the separation device.

In the above separation method, preferably, in the preparation step, a separation device further including a post-absorption separation unit mounted to the absorption processing unit and having an interior space communicating with the outlet of the absorption duct is prepared as the separation device, and in the post-absorption separation step, the mixed fluid discharged from the outlet of the absorption duct is introduced into the interior space of the post-absorption separation unit, and the mixed fluid is separated into the fluid to be processed after the target component has been absorbed and the absorption liquid after having absorbed the target component by a specific gravity difference in the interior space.

In this configuration, the absorption processing unit and the post-absorption separation unit are integrated with each other, and the outlet of the absorption duct and the interior space of the post-absorption separation unit are communicated with each other. Therefore, as in the case where a separator is separately provided apart from the absorption processing unit, there is no need to provide a pipe linking the outlet of the absorption duct and the separator. As a result, it is possible to reduce the manufacturing cost of the separation device.

In addition, in the case where the outlet of the absorption duct and the separator are linked by a pipe, pressure loss due to the pipe is generated. However, in this configuration, the outlet of the absorption duct and the interior space of the post-absorption separation unit are directly communicated with each other, therefore it is possible to prevent the occurrence of such a pressure loss due to the pipe.

In this case, preferably, in the preparation step, a separation device further including a fluid to be processed discharge passage connected to the post-absorption separation unit, for discharging the fluid to be processed after the target component has been absorbed from the interior space of the post-absorption separation unit, an absorption liquid discharge passage connected to the post-absorption separation unit, for discharging the absorption liquid after having absorbed the target component from the interior space of the post-absorption separation unit, a first check valve and a first pressure regulating valve provided in the fluid to be processed discharge passage, and a second check valve and a second pressure regulating valve provided in the absorption liquid discharge passage is prepared as the separation device, and in the post-absorption separation step, the first pressure regulating valve and the second pressure regulating valve control the pressure of the fluid to be processed discharged to the fluid to be processed discharge passage and the pressure of the absorption liquid discharged to the absorption liquid discharge passage so that the pressure of the fluid to be processed and the absorption liquid become equal, and the first check valve prevents the fluid to be processed flowing through the fluid to be processed discharge passage from reversely flowing to the absorption separation unit side and the second check valve prevents the absorption liquid flowing to the absorption liquid discharge passage from reversely flowing to the absorption separation unit side.

According to this configuration, by pressure control by means of the first pressure regulating valve and the second pressure regulating valve, it is possible to prevent the fluid to be processed separated in the interior space of the post-absorption separation unit from flowing into the absorption liquid discharge passage and to prevent the absorption liquid separated in the interior space of the post-absorption separation unit from flowing into the fluid to be processed discharge passage. In addition, by preventing the reverse flow by means of the first check valve and the second check valve, the influence of the process performed on the downstream side than the check valves can be suppressed from exerting on the post-absorption separation unit and the absorption duct on the upstream side than the check valves.

In the above separation method, preferably, the target component is $CO_2$, the fluid to be processed is a mixed gas containing $CO_2$, the absorption liquid is any of water, an amine-based solvent, an aqueous solution of the amine-based solvent, or an ionic liquid, and in the cooling step, the temperature of the cooling medium flowing through the cooling medium duct is controlled so that the temperature of the cooling medium is maintained in a range of not less than 10° C. and not more than 40° C.

According to this configuration, in the separation method for absorbing and separating $CO_2$ in the mixed gas by the absorption liquid that is any of water, an amine-based solvent, an aqueous solution of the amine-based solvent, or an ionic liquid, it is possible to perform concrete temperature control of the cooling medium capable of cooling the absorption liquid to the temperature suitable for causing the absorption liquid to absorb $CO_2$ successfully from the mixed gas.

In the above separation method, preferably, in the preparation step, a separation device further including a diffusion processing unit for diffusing the target component from the absorption liquid after having absorbed the target component separated during the post-absorption separation step, the diffusion processing unit having therein a diffusion duct that is a microduct, and a heat medium duct that is a microduct disposed at a position at which heat exchange is possible with the diffusion duct is prepared as the separation device, and the separation method further includes a diffusion step for causing the gas that is the target component to be diffused from the absorption liquid by causing a heat medium having a higher temperature than that of the absorption liquid after having absorbed the target component separated in the post-absorption separation step to pass through the heat medium duct while causing the absorption liquid to pass through the diffusion duct, and causing heat exchange between the heat medium flowing through the heat medium duct and the absorption liquid flowing through the diffusion duct.

According to this configuration, the target component can be diffused and recovered from the absorption liquid having absorbed the target component during the absorption step and separated during the subsequent post-absorption separation step. In addition, in the separation method according to the above embodiment, the absorption liquid is cooled during the absorption step, thereby the amount of the target component included in the absorption liquid introduced into the diffusion duct during the diffusion step is increased, and the temperature of the absorption liquid can be suppressed low. Therefore, even if the temperature of the heat medium to be flowing through the heat medium duct during the diffusion step is not very high, the target component can be sufficiently diffused from the absorption liquid. Accordingly, it is possible to perform diffusion and recovery of the target component from the absorption liquid successfully while reducing the energy necessary for heating the heat medium used in the diffusion step.

In this case, preferably, the target component is $CO_2$, the fluid to be processed is a mixed gas containing $CO_2$, the absorption liquid is any of water, an amine-based solvent, an aqueous solution of the amine-based solvent, or an ionic liquid, and in the diffusion step, the temperature of the heat medium flowing through the heat medium duct is controlled so that the temperature of the heat medium is maintained in a range of not less than 70° C. and not more than 95° C.

According to this configuration, in the separation method for absorbing and separating $CO_2$ in the mixed gas by the absorption liquid that is any of water, an amine-based solvent, an aqueous solution of the amine-based solvent, or an ionic liquid, it is possible to perform concrete temperature control of the heat medium capable of diffusion and recovery of $CO_2$ from the absorption liquid while reducing the energy necessary for heating of the heat medium.

The separation device according to the above embodiment is a separation device for separating a target component as a separation object from a fluid to be processed, the device including: an absorption processing unit for absorbing the target component into an absorption liquid from the fluid to be processed; and a post-absorption separation unit for separating, into the fluid to be processed and the absorption liquid, the mixed fluid of the fluid to be processed after the target component has been absorbed by the absorption liquid in the absorption processing unit and the absorption liquid after having absorbed the target component, and the absorption processing unit being provided with therein an absorption duct that is a microduct for causing the fluid to be processed and the absorption liquid to pass through in a state of mutual contact, thus causing the target component to be absorbed into the absorption liquid from the fluid to be processed during the process of passing through, and a cooling medium duct that is a microduct disposed at a position at which heat exchange is possible with the absorption duct, for causing a cooling medium having a lower temperature than that of the fluid to be processed and absorption liquid flowing through the absorption duct to pass therethrough, and causing heat exchange between the fluid to be processed and absorption liquid flowing through the absorption duct and the cooling medium.

In the separation device, for the same reason as the above separation method, it is possible to cool the entire absorption liquid flowing through the absorption duct successfully, and as a result, it is possible to prevent a decrease in the absorbed amount of the target component per unit liquid amount of the absorption liquid effectively. Therefore, it is possible to separate the target component from the fluid to be processed with an excellent separation efficiency. In addition, in the separation device, for the same reason as the above separation method, it is possible to miniaturize the absorption processing unit, and as a result, it is possible to miniaturize the separation device.

Preferably, the above separation device further includes a post-absorption separation unit mounted to the absorption processing unit and having an interior space communicating with the outlet of the absorption duct, and the post-absorption separation unit separates the mixed fluid discharged from the outlet of the absorption duct and introduced into the interior space of the post-absorption separation unit into the fluid to be processed after the target component has been absorbed and the absorption liquid after having absorbed the target component by a specific gravity difference.

According to this configuration, for the same reason as the above separation method, it is possible to reduce the manufacturing cost of the separation device, and it is possible to prevent the occurrence of pressure loss due to a pipe linking the outlet of the absorption duct and the interior space of the post-absorption separation unit.

In this case, preferably, the separation device further includes a fluid to be processed discharge passage connected to the post-absorption separation unit, for discharging the fluid to be processed after the target component has been absorbed from the interior space of the post-absorption separation unit, an absorption liquid discharge passage connected to the post-absorption separation unit, for discharging the absorption liquid after having absorbed the target component from the interior space of the post-absorption separation unit, a first check valve and a first pressure regulating valve provided in the fluid to be processed discharge passage, and a second check valve and a second pressure regulating valve provided in the absorption liquid discharge passage, and the first pressure regulating valve and the second pressure regulating valve control the pressure of the fluid to be processed discharged to the fluid to be processed discharge passage and the pressure of the absorption liquid discharged to the absorption liquid discharge passage so that the pressure of the fluid to be processed and the absorption liquid become equal, and the first check valve prevents the fluid to be processed flowing through the fluid to be processed discharge passage from reversely flowing to the absorption separation unit side and the second check valve prevents the absorption liquid flowing to the absorption liquid discharge passage from reversely flowing to the absorption separation unit side.

According to this configuration, by pressure control by means of the first pressure regulating valve and the second pressure regulating valve, it is possible to prevent the fluid to be processed separated in the interior space of the post-absorption separation unit from flowing into the absorption liquid discharge passage and to prevent the absorption liquid separated in the interior space of the post-absorption separation unit from flowing into the fluid to be processed discharge passage. In addition, by preventing the reverse flow by means of the first check valve and the second check valve, the influence of the process performed on the downstream side than the check valves can be suppressed from exerting on the post-absorption separation unit and the absorption duct on the upstream side than the check valves.

Preferably, the above separation device further includes a diffusion processing unit for diffusing the target component from the absorption liquid after having absorbed the target component separated by the post-absorption separation unit, and the diffusion processing unit is provided with therein a diffusion duct for causing the gas that is the target component to be diffused from the absorption liquid after having absorbed the target component separated by the post-absorption separation unit while causing the absorption liquid to pass therethrough, and a heat medium duct that is a microduct disposed at a position at which heat exchange is possible with the diffusion duct, for causing a heat medium having a higher temperature than that of the absorption liquid flowing through the diffusion duct to pass therethrough, and causing heat exchange between the absorption liquid flowing through the diffusion duct and the heat medium.

According to this configuration, for the same reason as the above separation method including the diffusion step, it is possible to perform diffusion and recovery of the target component from the absorption liquid successfully while reducing the energy necessary for heating the heat medium used for diffusion processing in the diffusion processing unit.

As discussed above, according to the above embodiment, it is possible to separate the target component from the fluid to be processed with an excellent separation efficiency while miniaturizing the separation device.

The invention claimed is:

1. A separation device for separating a target component as a separation object from a fluid to be processed, the device comprising: an absorption processing unit configured to absorb the target component into an absorption liquid from the fluid to be processed; a post-absorption separation unit configured to separate a mixed fluid into the fluid to be processed and the absorption liquid, the mixed fluid including the fluid to be processed after the target component has been absorbed by the absorption liquid in the absorption processing unit and the absorption liquid after having absorbed the target component, wherein the absorption processing unit includes an absorption duct, the fluid to be processed and the absorption liquid passing through the absorption duct in a state of mutual contact such that the target component is absorbed into the absorption liquid from the fluid to be processed during the process of passing through, the absorption duct being a microduct, and a cooling medium duct disposed at a position at which heat exchange is possible with the absorption duct, a cooling medium having a lower temperature than a temperature of the fluid to be processed and absorption liquid flowing through the absorption duct is passing through the cooling medium duct, and a heat being exchanged between the fluid to be processed and absorption liquid flowing through the absorption duct and the cooling medium, the cooling medium duct being a microduct; and a first controller being configured to control the temperature of the cooling medium flowing through the cooling medium duct by controlling a flow rate of the cooling medium delivered by a cooling medium delivery unit, wherein when the temperature of the cooling medium detected by an exit side cooling medium temperature sensor is higher than 40° C., the first controller is configured to increase the flow rate of the cooling medium, and when the temperature of the cooling medium detected by an entry side cooling medium temperature sensor is lower than 100 C, the first controller is configured to decrease the flow rate of the cooling medium.

2. The separation device according to claim 1, wherein the post-absorption separation unit mounted to the absorption processing unit includes an interior space communicating with an outlet of the absorption duct, the post-absorption separation unit being configured to separate the mixed fluid by a specific gravity difference, the mixed fluid being discharged from the outlet of the absorption duct and introduced into the interior space of the post-absorption separation unit.

3. A separation device for separating a target component as a separation object from a fluid to be processed, the device comprising:
an absorption processing unit configured to absorb the target component into an absorption liquid from the fluid to be processed;
a post-absorption separation unit configured to separate a mixed fluid into the fluid to be processed and the absorption liquid, the mixed fluid including the fluid to be processed after the target component has been absorbed by the absorption liquid in the absorption processing unit and the absorption liquid after having absorbed the target component;
a fluid to be processed discharge passage connected to the post-absorption separation unit, the fluid to be processed discharge passage being configured to discharge the fluid to be processed after the target component has been absorbed from the interior space of the post-absorption separation unit;
an absorption liquid discharge passage connected to the post-absorption separation unit, the absorption liquid discharge passage being configured to discharge the absorption liquid after having absorbed the target component from the interior space of the post-absorption separation unit;
a first check valve and a first pressure regulating valve provided in the fluid to be processed discharge passage, the first check valve being configured to prevent the fluid to be processed flowing through the fluid to be processed discharge passage from reversely flowing to the absorption separation unit side; and
a second check valve and a second pressure regulating valve provided in the absorption liquid discharge passage, the second check valve being configured to prevent the absorption liquid flowing to the absorption liquid discharge passage from reversely flowing to the absorption separation unit side,
wherein the absorption processing unit includes
an absorption duct, the fluid to be processed and the absorption liquid passing through the absorption duct in a state of mutual contact such that the target component is absorbed into the absorption liquid from the fluid to be processed during the process of passing through, the absorption duct being a microduct, and
a cooling medium duct disposed at a position at which heat exchange is possible with the absorption duct, a cooling medium having a lower temperature than a temperature of the fluid to be processed and absorption liquid flowing through the absorption duct is passing through the cooling medium duct, and a heat being exchanged between the fluid to be processed and absorption liquid flowing through the absorption duct and the cooling medium, the cooling medium duct being a microduct,
wherein the post-absorption separation unit mounted to the absorption processing unit includes an interior space communicating with an outlet of the absorption duct, the post-absorption separation unit being configured to separate the mixed fluid by a specific gravity difference, the mixed fluid being discharged from the outlet of the absorption duct and introduced into the interior space of the post-absorption separation unit, and
wherein the first pressure regulating valve and the second pressure regulating valve are configured to control a pressure of the fluid to be processed discharged to the fluid to be processed discharge passage and the pressure of the absorption liquid discharged to the absorption liquid discharge passage so that the pressure of the fluid to be processed and the absorption liquid become equal.

4. A separation device for separating a target component as a separation object from a fluid to be processed, the device comprising: an absorption processing unit configured to absorb the target component into an absorption liquid from the fluid to be processed, a post-absorption separation unit configured to separate a mixed fluid into the fluid to be processed and the absorption liquid, the mixed fluid including the fluid to be processed after the target component has been absorbed by the absorption liquid in the absorption processing unit and the absorption liquid after having absorbed the target component, wherein the absorption processing unit includes an absorption duct, the fluid to be processed and the absorption liquid passing through the absorption duct in a state of mutual contact such that the target component is absorbed into the absorption liquid from the fluid to be processed during the process of passing through, the absorption duct being a microduct, and a cooling medium duct disposed at a position at which heat exchange is possible with the absorption duct, a cooling medium having a lower temperature than a temperature of the fluid to be processed and absorption liquid flowing through the absorption duct is passing through the cooling medium duct, and a heat being exchanged between the fluid to be processed and absorption liquid flowing through the absorption duct and the cooling medium, the cooling medium duct being a microduct; a diffusion processing unit configured to diffuse the target component from the absorption liquid after having absorbed the target component separated by the post-absorption separation unit, wherein the diffusion processing unit includes a diffusion duct, the target component being diffused from the absorption liquid after having absorbed the target component separated by the post-absorption separation unit while the absorption liquid is passing through the diffusion duct, and a heat medium duct disposed at a position at which heat exchange is possible with the diffusion duct, a heat medium having a higher temperature than the temperature of the absorption liquid flowing through the diffusion duct is passing through the heat medium duct and the heat being exchanged between the absorption liquid flowing through the diffusion duct and the heat medium, the heat medium duct being a microduct; and a second controller being configured to control the temperature of the heat medium flowing through the heat medium duct by controlling a flow rate of the heat medium flowing through the heat medium duct, wherein when the temperature of the heat medium detected by an exit side heat medium temperature sensor is lower than 70° C., the second controller is configured to increase the flow rate of the heat medium, and when the temperature of the heat medium detected by an entry side heat medium temperature sensor is higher than 950 C, the second controller is configured to decrease the flow rate of the heat medium.

5. The separation device according to claim 1, wherein the absorption duct includes:
- a fluid to be processed introduction passage, the fluid to be processed being introduced and flowing through the fluid to be processed introduction passage;
- an absorption liquid introduction passage, the absorption liquid being introduced and flowing through the absorption liquid introduction passage; and
- a mixed fluid duct, the fluid to be processed and the absorption liquid flowing after the fluid to be processed and the absorption liquid joining together.

* * * * *